Nov. 21, 1950     F. H. MUELLER     2,530,899
LOCKING DEVICE FOR VALVES AND THE LIKE
Filed April 18, 1946     3 Sheets-Sheet 1
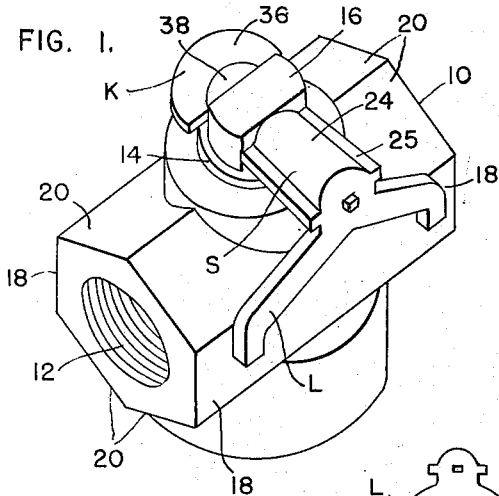
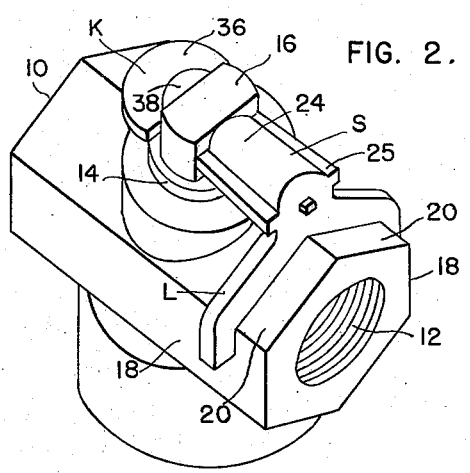
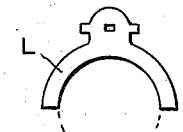
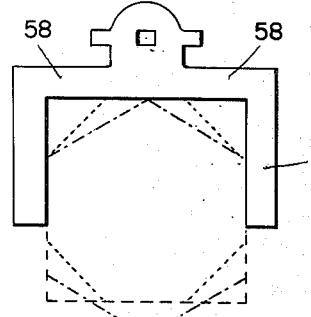
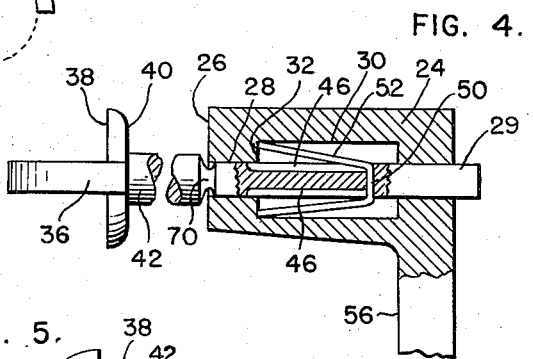
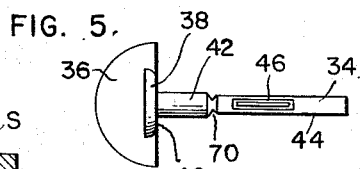
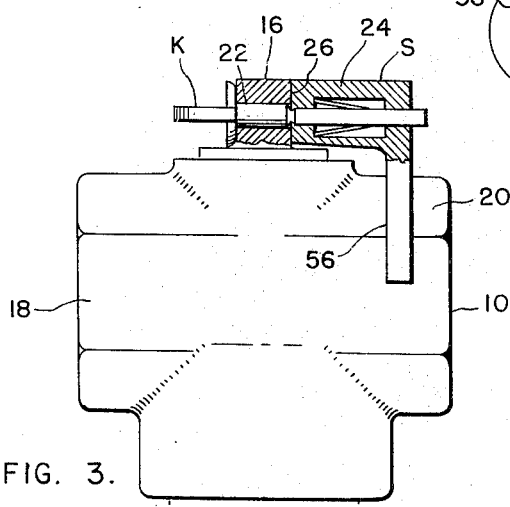
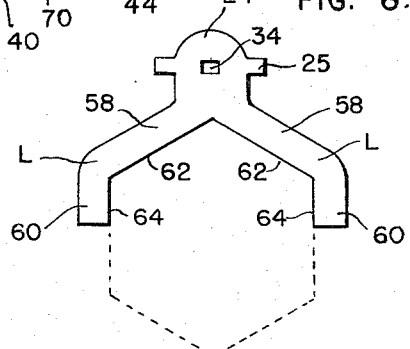
Inventor
FRANK H. MUELLER
Cushman Darby & Cushman
Attorneys Nov. 21, 1950       F. H. MUELLER       2,530,899
LOCKING DEVICE FOR VALVES AND THE LIKE
Filed April 18, 1946       3 Sheets-Sheet 2
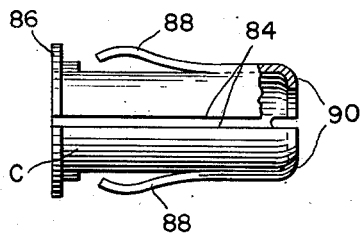
FIG. 8.
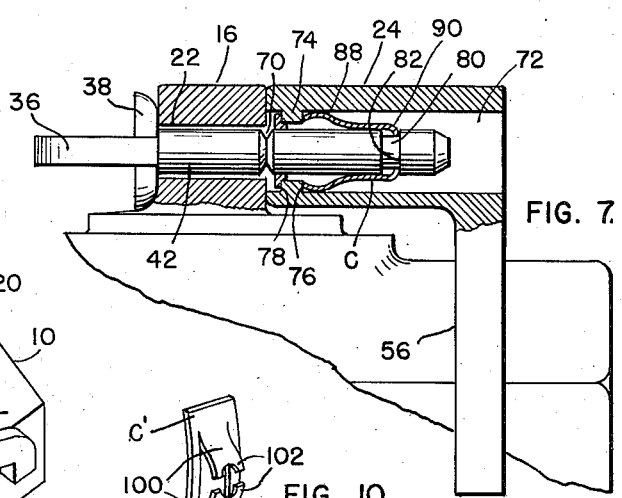
FIG. 7.
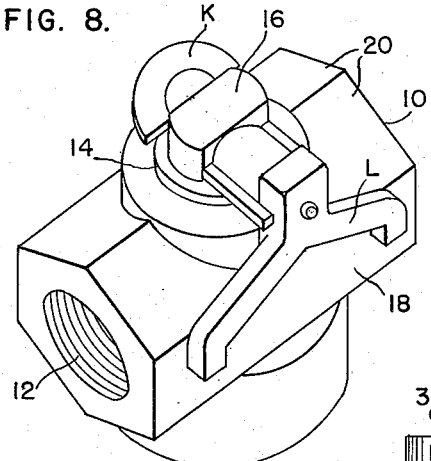
FIG. 14.
FIG. 10.
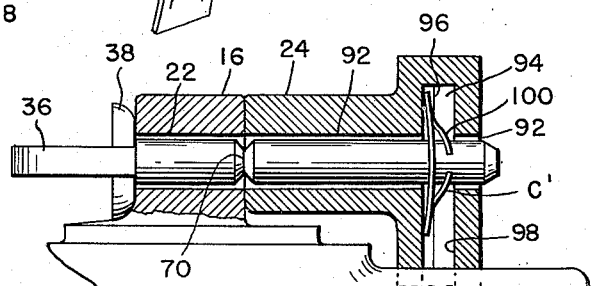
FIG. 9.
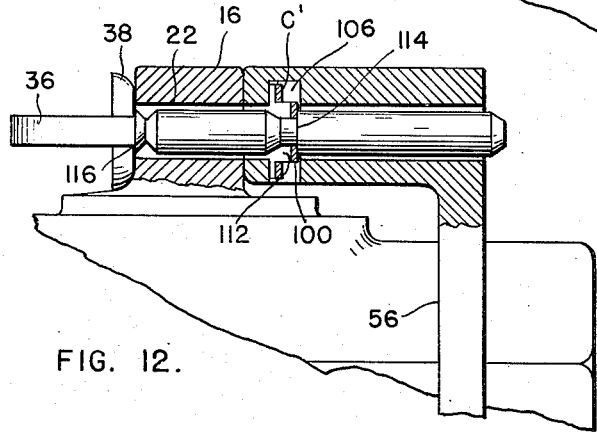
FIG. 12.
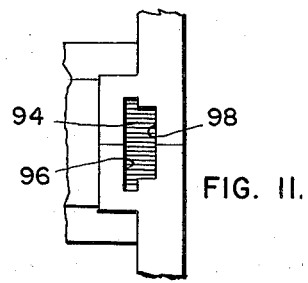
FIG. 11.
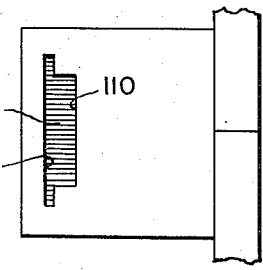
FIG. 13.
Inventor
FRANK H. MUELLER
Cushman Darby & Cushman
Attorneys

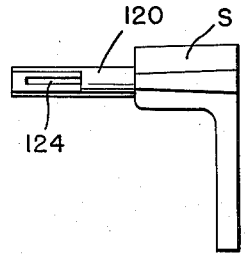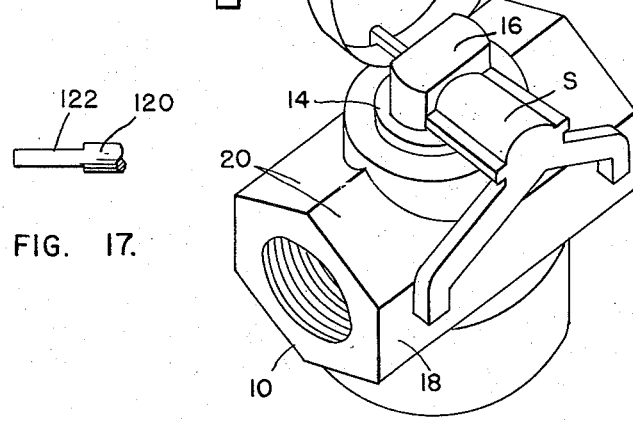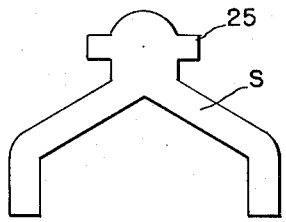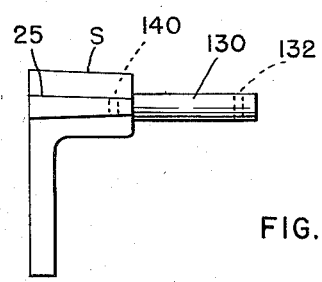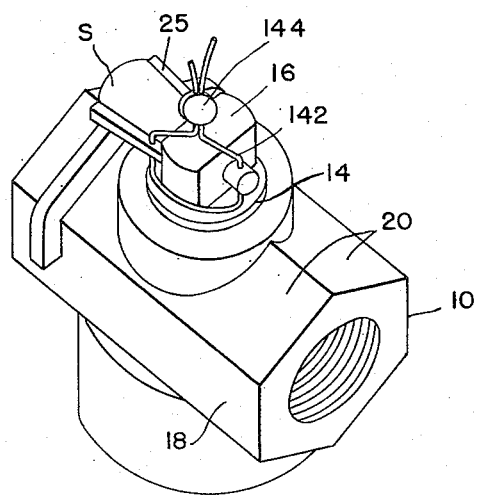

Patented Nov. 21, 1950

2,530,899

UNITED STATES PATENT OFFICE 2,530,899

LOCKING DEVICE FOR VALVES AND THE LIKE

Frank H. Mueller, Decatur, Ill., assignor to Mueller Co., Decatur, Ill., a corporation of Illinois Application April 18, 1946, Serial No. 663,172

6 Claims. (Cl. 292—307)

The present invention relates to sealing devices for operating members such as used for stop valves of the plug type, wherein it is desired to insure that such a member or valve is retained in the condition to which it is adjusted by an authorized attendant. In the case of certain fluid or similar systems, for instance, systems in which a meter is associated for recording the quantity of fluid used, it is frequently desired to set a valve member either in open or closed position, and insure that it is left in such position until the following periodic visit of an attendant whose duty it is to maintain the system in adjustment, or read the meter. Under such circumstances, it has been the custom to provide some sealing arrangement having a frangible element which must be visibly damaged or rendered inoperative before the valve or other member can be changed in adjustment, whereby any unauthorized change in the adjustment or tampering with the valve or other member will be apparent to the attendant when he makes his next authorized visit.

One of the principal objects of the invention is to provide such a sealing device designed so as to be capable of use in association with the valve or other member when it is selectively adjusted to one of a plurality of positions, particularly when the valve or other member is adjusted to either closed or open position. Ancillary to this general objective, it is intended that the sealing device of the present invention may be applied to a valve operating head with the valve member in either position, which does not require the provision of any special locking or engaging surfaces on the valve body itself, or on the conduit with which the device is associated, the dual applicability of the device to the body on which it is used being made possible by the design of the sealing device itself.

It will be understood that while the present invention is most useful in association with stop cocks in fluid conduits, it may also be employed in connection with other controlling members whose position is altered by a handle or head to which the device may be applied. It will also be understood that the term "conduit" is used herein in a general sense, meaning a pipe line or valve body or the like positioned in the pipe line.

The particular design of the sealing element may take one of several forms, as illustrated herein, but the features and advantages generally referred to above are characteristics of all of the forms or modifications of the invention disclosed herein.

In the drawings, which are intended to be illustrative, not confining the invention to any precise design except as defined in the appended claims:

Figure 1 is a perspective view of the preferred form of the invention applied to a valve of the rotary plug type, showing the manner in which the invention is useful in sealing said valve in its open position.

Figure 2 is a similar perspective view, illustrating the dual applicability of the sealing device to the same valve when it is desired to seal the same in closed position.

Figure 3 is a side elevational view of the device as applied in Figure 2, showing a portion of the device in section in order to illustrate the locking mechanism thereof.

Figure 4 is a partial vertical sectional view on an enlarged scale, which more intimately discloses the manner of operation of the locking device or key.

Figure 5 is a top plan view of the locking key.

Figure 6 is an end view of the locking saddle as applied to the valve body in Figure 3, viewing Figure 3 looking inwardly from the right hand side thereof.

Figure 6a illustrates possible modifications of the legs of the saddle to fit one or more conduit shapes of polygonal cross-section, the view being similar to that of Figure 6.

Figure 6b is a similar view on a reduced scale showing a further possible modification in the form of the legs.

Figure 7 is a view similar to Figure 3 of a modified form of the invention.

Figure 8 is a side elevational view of a spring clip element which may be employed in connection with the embodiment of Figure 7.

Figure 9 is a side elevational view, partly in section, and similar to Figure 3, showing a further modified form of the invention.

Figure 10 is a perspective view of a spring clip element which is used with the modification of Figures 9 and 12.

Figure 11 is a partial bottom view showing the receiving channel of the saddle of Figure 9 in which the spring clip of Figure 10 is placed.

Figure 12 is a side elevational view, partly in section, of another form of the invention, the view being similar to Figure 3 and showing another manner in which the spring clip of Figure 10 may be employed.

Figure 13 is a bottom view of the channel in which the spring clip may be positioned as indicated in Figure 12.

Figure 14 is a perspective view, similar to Figure 1, showing the manner in which any of the embodiments of Figures 7, 9 and 12 may be applied to seal the valve in its open position.

Figure 15 is a perspective view, similar to Figure 1, showing a further modification of the invention, wherein a metallic strap is used to complete the seal.

Figure 16 is a side elevational view of a saddle member of the type employed in the modification of Figure 15.

Figure 17 is a partial top plan view of the inner end of the shank of the saddle member of Figure 16.

Figure 18 is an outer end view of the saddle member of the embodiment of Figures 15 and 19.

Figure 19 is a perspective view, generally similar to Figure 2, of a further modification of the invention, wherein sealing wires are employed to complete the seal.

Figure 20 is a side elevational view of the saddle member used in the embodiment of Figure 19.

Referring to Figure 1, a typical mechanism which it is desired to maintain in proper adjustment is illustrated, this member being a stop valve of the plug type. The associated conduit 10 has a longitudinal bore or fluidway 12 therethrough, which bore is controlled by a valve member 14 of the rotary plug type having an upwardly extending head 16 flattened on opposite sides as shown for the reception of a handle or wrench to turn the valve. As shown in this figure, the valve body 10 or the adjacent conduit in which the valve is positioned may be of hexagonal shape in cross-section, having opposite vertical flat surfaces 18 and arched top and bottom surfaces 20. As referred to hereafter, the invention need not be confined to use of the sealing device with any particular outside configuration of the valve body or conduit, as the saddle of the sealing member may be designed for dual cooperation with conduits of any well known shape, in fact, the saddle may be designed to cooperate with any one of several similar shapes.

The head 16 of the valve member is provided with a lateral opening 22 extending centrally through the shorter dimension thereof, and by means now to be described, the sealing mechanism is designed to be inserted and locked through said opening, with portions of said sealing member rigidly engaging the body of the conduit to retain the valve member in the adjusted position unless the sealing member is injured to an extent which will be apparent to the attendant at his next periodic visit.

In the preferred form of the invention, the sealing device comprises two main elements, a saddle S and a key K, and these elements are inserted through the opposite ends of the opening 22 through the head 16, and when locked together, they retain the valve in its adjusted position.

The saddle comprises an inwardly tapered body 24 having an inner end 26 which is adapted to abut against one of the wide faces of the head 16, there being a longitudinal bore 28, 29 through the body of the saddle which aligns with the opening 22 through the head 16. Within the body 24, there is an enlarged cavity 30 between the opposite ends of the bore, and the inner end of this cavity forms a locking shoulder 32 for the purpose hereinafter described. The saddle and its legs may be made of any suitable metal, such as cast aluminum. The body 24 may have side strengthening ribs 25 which facilitate gripping it.

Referring to Figures 4 and 5, the key comprises an elongated shank 34, of length slightly greater than the length of the body of the saddle plus the shorter width of the turning member 16, and a handle comprising a flat semi-circular portion 36 and a substantially circular disk portion 38 formed integral with the portion 36, but being generally in a plane at right angles thereto, the portions 36 and 38 forming a unitary inner surface 40 which abuts against the opposite flat face of the head 16 when the key is inserted through the opening 22. The inner end of the shank of the key comprises a cylindrical portion 42 of length equal to the short dimension of the head 16, the remainder of the shank comprising a flattened portion 44 having elongated depressions 46 in opposite flat faces thereof, there being a hole extending through the key as at 50 at the end of the depression 46 remote from the handle of the key.

It will be understood that the key is made up as a separate unit from the saddle, and when made up, a length of piano wire 52 is bent through the opening 50 in the shank of the key, the free ends of the wire extending toward the handle of the key. The width of the piano wire is somewhat less than the width of the grooves 46 so that the wire can enter said grooves when the key is being inserted.

Returning now to Figure 1, when it is desired to adjust the valve in its open or closed position, the body of the saddle is positioned with its end 26 against one flat side of the head 16, and the key is inserted through the opening 22 from the opposite side of the head as indicated in Figure 3. As the key is forced through the enlarged section 28 of the longitudinal bore through the saddle, the spring wire 52 is forced down into the opposite grooves 46 in the shank of the key, and the end of the key moves through the outer section 29 of the bore until the free ends of the spring wire pass the shoulder 32, at which time the wire springs outwardly so that its ends engage said shoulder, thus precluding the withdrawal of the key from the bore of the saddle. The key may snap into locked position either loose or tight depending on the length of the piano wire. Because of the engagement of the legs of the saddle with the conduit or valve body, it is now impossible to tamper with or turn the valve, as the key cannot be removed without injuring or fracturing some part of the sealing mechanism.

Referring to Figure 6, the outer end of the saddle has formed integral therewith downwardly depending open legs L, these legs having flat vertical inside engaging surfaces 56 which are in a plane at right angles to planes passing through the axis of the bore through the saddle.

When used on a conduit of the form shown in Figure 1, portions of the inner surface 56 of the legs L contact the flat side surface 18 of the conduit or valve body at spaced points when the saddle is positioned to seal the valve in its open position, and when the key is locked into the saddle as previously described the engagement of the surface 56 of the legs with the flat side surface of the conduit prevents turning of the valve without fracturing some part of the sealing mechanism. It will be understood that the length of the body of the saddle and that of the legs is such as to insure firm engagement of surfaces 56 of the legs with surface 18 of the conduit. The legs should reach substantially to a mid-plane through the axis of the conduit.

As shown in Figure 6, in end view, the legs of the saddle are in substantially arch form, comprising inclined portions 58 and short upright portions 60, the inside of the legs respectively comprising slanting surfaces 62 and vertical surfaces 64. The surfaces 62 join one another in their apex in an angle of substantially 120°, and each of them join the adjacent surfaces 64 in an angle of approximately the same degree, so that when the saddle is employed as in Figure 2 to lock the valve in its closed position, the legs of the saddle straddle the conduit or valve body to lock the valve closed with such firmness that the sealing device must be fractured to break the lock. When applied to the conduit as in Figure 3, the bottom surfaces 62 of the legs rest on the slanting surface 20 of the conduit and the vertical inside surfaces 64 of the legs embrace the side faces 18 of the conduit or valve body. Thus, each leg is operative to prevent the valve from being turned in a particular direction, it being likewise apparent in Figure 1 that each leg of the saddle is operative, as each leg depends far enough so that its inner face 56 bears against the side face 18 of the conduit or valve body.

While I have shown the saddle designed in such manner as to have a dual use on a conduit of hexagonal form, it will be understood that the saddle and the legs thereof may be designed to similarly cooperate in the same manner with conduits or other cross-sectional shape. For example, if the conduit is square or rectangular in cross-section, the leg portions 58 (Figure 6) may be arranged at right angles to the leg portions 60 with the surfaces 62 and 64 being likewise at right angles with respect to one another. Such legs would embrace a square conduit in the manner shown in Figure 6a, and their inner surfaces 56 would bear against the vertical side of the conduit when the valve is in the position of Figure 1. In fact, by suitable design, and particularly by lengthening the leg portions 60 (Figure 6a), a single design might fit any one of a number of similar cross-sectional shapes. For example, leg portions arranged at right angles to one another and with the portions 60 of extended length might fit both square or polygonal cross-sectional shapes in both of the positions of the valve head as described.

It is also within the scope of the present invention to so form the saddle, as a modification, so as to fit conduits or valve bodies which are circular in shape. In this instance, the lower faces of the legs 62 and 64 might merge together into a circle in order to fit a circular pipe as shown in Figure 6b, and the inner faces 56 of the legs might be suitably curved or merely left in flat condition as shown to function in the position of Figure 1 to retain the valve member against turning. However, legs of the rectangular or arch design could be adapted to fit circular conduits.

Referring to Figures 4 and 5, the shank of the key may be weakened at any point, such as at 70, in order to remove the saddle and readjust the valve, it merely being necessary to grasp the saddle and apply sufficient pulling force thereon to break the key at its weak point, which, in this instance, is the point where the inner face 26 of the saddle engages the flat face of the head 16. Thereafter, the handle portion of the key may be easily removed from the opening 22, while the remains of the shank may be removed from the bore of the saddle by forcing the same to the right as viewed in Figure 4 and out through the portion 29 of the bore through the saddle, the spring wire 52 being capable of contraction to accommodate this removal. Similar facility for removing the key from the saddle for reuse of the saddle will be apparent in embodiments hereinafter described.

In Figure 7 a modified saddle and key construction is shown, it being understood that the dominant characteristics of the preferred embodiment of the invention are likewise present in this modification, particularly the dual applicability of the saddle to conduits or valve bodies. In this modification, the body 24 of the saddle has a relatively wide bore 72 extending entirely through it, except for an interior collar 74 which provides an outer shoulder 76 and an inner shoulder 78 in the bore. The shank of the key is similar to that previously described, except that it is substantially cylindrical throughout and has a reduced portion 80 forming a retaining shoulder 82.

In cooperation with this form of saddle and key, any convenient form of spring clip C may be used on the shank, a practical form being illustrated in Figure 8. This clip comprises a blank of spring tempered brass, bronze or steel suitably stamped and cut and which is bent into generally cylindrical form, with the end edges 84 thereof spaced from one another to permit the necessary resiliency of the clip. At one end of the clip there is an outwardly bent flange 86 which limits the insertion of the clip into the bore of the saddle, this flange being adapted to contact the shoulder 78 in the bore of the saddle, as shown in Figure 7. One or more spring fingers 88 may be cut and bent outwardly from the cylindrical blank of the clip as is well known in the art, and the outer ends of these cut out portions are adapted to depress as the clip is pressed into the outer end of the bore of the saddle. The ends of these spring-like members 88 preclude withdrawal of the clip from the bore by their engagement with the shoulder 76 therein. At the end of the clip opposite to the flange 86, there are spring-like flanges 90 bent inwardly toward the axis of the clip, and when the shank of the key is passed into the bore of the saddle, as shown in Figure 7, these spring-like ends 90 will flex into the reduced collar 80 of the shank and will prevent removal of the latter by their engagement with the shoulder 82 of the shank. It will be understood that in assembling this form of the apparatus, the clip may first be inserted into the bore of the saddle, and after the saddle is applied to the valve head, a key is inserted through the hole 22 in the head 16 of the valve, and thence through the clip as shown in Figure 7, to effect the lock. When locked, the valve cannot be turned without removal of the saddle by fracturing the shank of the key at 70 as previously described.

It will be understood that the design of the saddle, particularly the legs thereof, may in this form, as in the case of the preferred embodiment, be designed to lock the valve either in the closed or open position by straddling the conduit as in Figure 2, or engaging the side surfaces thereof as in Figure 1.

Referring to Figure 9, the bore 92 through the body of the saddle is of uniform diameter throughout, except for an enlarged chamber 94 adjacent the outer end thereof, there being reduced portions of the bore 92 on opposite sides of the enlarged chamber 94, the latter being substantially centrally located with respect to the legs of the saddle as viewed in Figure 11. As shown in Figure 11, the enlarged chamber 94 comprises an inner wide section 96 and an outer narrow section 98, and another form of spring clip C' (Figure 10) is inserted upwardly into the chamber 94 into position to receive the end of the shank of the key. As illustrated in Figure 10, the clip C' is slightly curved throughout its long dimension, and spring fingers 100 are bent outwardly therefrom, the ends of said fingers being provided with semi-circular cut-outs 102 to pass the end of the shank of the key, the edges of the fingers being sharp enough to engage the shank when it is forced through the clip, as shown in Figure 9, the resiliency of the fingers being sufficient to prevent removal of the shank of the key, once it is inserted. If desired, the outer end of the key may have a reduced portion or a retaining shoulder similar to the parts 80 and 82 illustrated in Figure 7, to insure locking action of the fingers 100 against the end of the shank.

The manner of application of this embodiment of the invention will be apparent from previous descriptions, i. e., the clip will be inserted into the chamber 94 as shown and thereafter the key will be inserted through the head 16 of the valve and through the bore of the saddle to securely lock the valve in its adjusted position.

A further refinement of the embodiment of Figure 9 is illustrated in Figures 12 and 13. In this embodiment, an enlarged chamber 106 is provided adjacent the inner end of the bore through the body of the saddle, and the same spring clip C' may be employed, but it is inserted upwardly into the chamber 106 in a position substantially 90° from that illustrated in Figure 11, and the portions 108 and 110 of the chamber are correspondingly wider than the similar portions 96 and 98 of Figure 11 in order to receive the clip in this position. To cooperate with this arrangement, the shank of the key is reduced as at 112 at a point located substantially centrally of its length, thus forming a shoulder 114 which engages the fingers 100 of the clip to prevent removal of the shank of the key without fracturing the same, as will be understood from previous descriptions. As in the case of embodiments described above, the lock cannot be broken without fracturing this key at either of its weakened positions 112 or 116. It will be understood that the embodiments of Figures 7, 9 and 12 may be of such design as to be capable of dual application to a conduit or valve body, as previously described, either in the straddling position with the valve closed, or in the side engaging position when the valve is locked open, as is illustrated in Figure 14. As in the case of all other embodiments of the application, the legs of the saddle may be designed to fit one or more of various cross-sectional shapes of conduits as previously mentioned.

A further embodiment of the invention is disclosed in Figures 15 through 18. Referring to Figure 16, the body of the saddle may be solid and it is provided with a reduced shank 120 of cylindrical cross-section where it passes through the opening in the head 16, said shank terminating in a flattened end 122 having a horizontal opening or slot 124 therethrough. With this arrangement, the device is applied as shown in Figure 15 with the shank extending through the turning member 16 of the valve, and thereafter a conventional metallic tape 126 is threaded through the slot 124, the free ends of the tape being permanently locked together in any manner well known in the art as by the sealing device generally illustrated at 128. In this embodiment, the valve cannot be turned without tearing or cutting the metallic tape 126, and all parts disclosed may be reused with the exception of the short end of the tape after it is cut, as well as those parts of the locking means 128 which are incapable of reuse.

The embodiment of Figures 19 and 20 is somewhat similar to that of Figure 15, the saddle being solid and having a shank 130 of cylindrical section throughout, which has an aperture 132 through the outer end thereof. There are also apertures 140 on the strengthening boss 25 along the side of the body, and after the shank 130 is inserted through the turning member 16, a conventional sealing wire 142 is passed through the openings 132 and 140 and is locked by the conventional sealing button or wafer 144.

In all of the embodiments disclosed herein, it will be understood that the saddle may be applied straddling either end of the valve body, or on either side thereof, no special abutments on the valve body or conduit being required. Obviously, the saddle may be applied to vertical or horizontal conduits, or from above or below the conduit, depending on the position of the head and its accessibility.

I claim:

1. Apparatus of the character described comprising a valve mounted for turning movement in a conduit between adjusted positions, said valve having an outwardly extending head with opposite flat side surfaces and an opening therethrough between said surfaces, a locking saddle having a forward face to abut one of the side surfaces of said head and a key extending from said face through said opening, said saddle having legs for engaging the conduit to prevent turning of the valve therein, and means on the outer end of said key for engaging the other side surface of said head and providing against withdrawal of said key through said opening in the direction of said saddle.

2. A construction in accordance with claim 1 wherein said saddle has a bore extending inwardly from its forward face, and wherein said key comprises a separate member adapted to be inserted through the opening in said head and into said bore, there being cooperating means on said key and in the bore of said saddle to lock said key in said bore when inserted therein.

3. A locking saddle for a valve head mounted for turning movement in a conduit between adjusted positions and having opposite flat side surfaces and an opening extending therethrough between said surfaces, said saddle comprising a body positioned in its entirety on one side of the head and having a forward flat end face abutting one of the side surfaces of the head, there being a reduced shank extending longitudinally from said face through the opening in the head, and means on the outer end of said shank engaging the other of the side surfaces of the head for locking said shank against withdrawal through said opening, said saddle having a pair of spaced legs at the rearward end of its body for straddling the conduit and for engaging opposite sides thereof when locked to the head in one adjusted position thereof, said body being of length whereby said legs will engage the same side wall of the conduit at spaced points when locked to the head in another adjusted position thereof.

4. A locking saddle for a valve head mounted for turning movement in a conduit between adjusted positions and having opposite flat side surfaces and an opening extending therethrough between said surfaces, said saddle comprising a body positioned in its entirety on one side of the head and having a forward flat end face abutting one of the side surfaces of the head, said body having a longitudinal bore therein in alignment with the opening in the head with locking means in said bore, said body having a reduced shank comprising a key extending longitudinally from said face through the opening in the head with means on its outer end engaging the other of the side surfaces of the head, said key having an inner portion extending into the bore of said body with cooperating locking means thereon to lock said key in said bore, said saddle having a pair of spaced legs at the rearward end of its body for straddling the conduit and for engaging opposite sides thereof when locked to the head in one adjusted position thereof, said body being of length whereby said legs will engage the same side wall of the conduit at spaced points when locked to the head in another adjusted position thereof.

5. A locking saddle for a valve head mounted for turning movement in a conduit between adjusted positions and having opposite flat side surfaces and an opening extending therethrough between said surfaces, said saddle comprising a body positioned in its entirety on one side of the head and having a forward flat end face abutting one of the side surfaces of the head, said body having a longitudinal bore therein in alignment with the opening in the head and a retaining shoulder in said bore, said body having a reduced shank comprising a key extending longitudinally from said face through the opening in the head with means on its outer end engaging the other of the side surfaces of the head, said key having an inner portion extending into the bore of said head with spring locking means thereon to engage behind said retaining shoulder to lock said key in said bore, said saddle having a pair of spaced legs at the rearward end of its body for straddling the conduit and for engaging opposite sides thereof when locked to the head in one adjusted position thereof, said body being of length whereby said legs will engage the same side wall of the conduit at spaced points when locked to the head in another adjusted position thereof, said key having a weakened portion to facilitate breaking the key for removal of the locking saddle.

6. A locking saddle for a valve head mounted for turning movement in a conduit between adjusted positions and having opposite flat side surfaces and an opening extending therethrough between said surfaces, said saddle comprising a body positioned in its entirety on one side of the head and having a forward flat end face abutting one of the side surfaces of the head, said body having a longitudinal bore therein in alignment with the opening in the head with an enlarged spring clip receiving compartment in said bore, a separate spring clip in said compartment, said body having a reduced shank comprising a key extending longitudinally from said face through the opening in the head with locking means on its outer end engaging the other of the side surfaces of the head, said key having an inner portion extending into the bore of said body with means thereon to lock with the spring element of said clip, the side of said body presented toward the conduit having a lateral opening therein leading to said compartment for insertion of said spring clip, said saddle having a pair of spaced legs at the rearward end of its body for straddling the conduit and for engaging opposite sides thereof when locked to the head in one adjusted position thereof, said body being of length whereby said legs will engage the same side wall of the conduit at spaced points when locked to the head in another adjusted position thereof.

FRANK H. MUELLER.

REFERENCES CITED

The following references are of record in the file of this patent:

UNITED STATES PATENTS

| Number | Name | Date |
| --- | --- | --- |
| 237,564 | Mackey | Feb. 8, 1881 |
| 1,512,632 | O'Connor | Oct. 21, 1924 |
| 1,590,032 | Jauch | June 22, 1926 |
| 1,683,649 | Belote | Sept. 11, 1928 |
| 1,908,241 | Heeren et al. | May 9, 1933 |